US006606356B1

(12) United States Patent
Nanya

(10) Patent No.: US 6,606,356 B1
(45) Date of Patent: *Aug. 12, 2003

(54) ASYNCHRONOUS DIGITAL SYSTEM, ASYNCHRONOUS DATA PATH CIRCUIT, ASYNCHRONOUS DIGITAL SIGNAL PROCESSING CIRCUIT AND ASYNCHRONOUS DIGITAL SIGNAL PROCESSING METHOD

(75) Inventor: Takashi Nanya, Kawasaki (JP)

(73) Assignee: Center For Advanced Science and Technology Incubation, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/430,130

(22) Filed: Oct. 29, 1999

Related U.S. Application Data

(63) Continuation of application No. 08/948,483, filed on Oct. 10, 1997, now Pat. No. 6,038,259.

(30) Foreign Application Priority Data

Jun. 13, 1997 (JP) .............................................. 9-173086

(51) Int. Cl.$^7$ .............................. H04B 14/04; H04J 3/06
(52) U.S. Cl. ....................................... 375/254; 370/508
(58) Field of Search .............................. 375/254–371; 370/468, 516

(56) References Cited

U.S. PATENT DOCUMENTS

| | | | |
|---|---|---|---|
| 5,469,549 A | | 11/1995 | Simpson et al. |
| 5,748,487 A | | 5/1998 | Sawasaki et al. |
| 5,878,097 A | * | 3/1999 | Hase et al. .................. 375/371 |
| 5,949,795 A | * | 9/1999 | Moroney et al. ............ 370/516 |
| 6,038,259 A | * | 3/2000 | Nanya ........................ 375/254 |
| 6,064,706 A | * | 5/2000 | Driskill et al. .............. 375/372 |

OTHER PUBLICATIONS

T. Nanya, "Asynchronous Processors—Toward High–performance VLSI Systems," Information Processing vol. 134, No. 1, pp. 72–90, Jan. 1993.

S.B. Furber et al., "AMULTE1: A micropipelined ARM," in Proc. IEEE Computer Conf., pp. 476–485, Mar. 1994.

T. Nanya et al., "TITAC: Design of quasi–delay–insensitive microprocessor," IEEE Design & Test of Computers vol. 11, No. 2, pp. 50–63 (1994).

Y. Ueno et al., "Design and Evaluation of Asynchronous Processor TITAC." IEICE Technical Report, FIS94–26, Apr. 1994.

Y. Ueno et al., "Delay Insensitivity of Asynchronous Processor TITAC," 1995 IEICE National Meeting 1, No. D–140, Mar..

A.J. Martin, "The limitations to delay–insensitivity in asynchronous circuits," in Sixth MIT Conf. on Advanced Research in VLSI, pp. 263–278 (1990).

\* cited by examiner

Primary Examiner—Stephen Chin
Assistant Examiner—Lawrence Williams
(74) Attorney, Agent, or Firm—Foley & Lardner

(57) ABSTRACT

An asynchronous digital system, an asynchronous data path circuit, an asynchronous digital signal processing circuit and an asynchronous digital signal processing method, which enables improved processing speed while maintaining high reliability are provided by dividing the overall chip into blocks with a specified area, forming the connection between the blocks by applying thereto a delay insensitive (DI) model or a quasi delay insensitive (QDI) model, while forming each block by applying thereto a scalable delay insensitive (SDI) model. In the SDI model, the system is configured using circuit components having a delay assumed during design in which if the specification states that a signal transition (b) in a subcircuit 7 precedes a signal transition (c) in a subcircuit 8, $\kappa \cdot Tab < Tac$ is established wherein Tab is the time from the occurrence of the signal transition (a) that is a common cause until the occurrence of the signal transition (b) and Tac is the time from the occurrence of the signal transition (a) until the occurrence of the signal transition (c). $\kappa$ is a constant that is defined to be a real number larger than 1.

18 Claims, 10 Drawing Sheets

ASYNCHRONOUS DIGITAL SYSTEM, ASYNCHRONOUS DATA PATH CIRCUIT, ASYNCHRONOUS DIGITAL SIGNAL PROCESSING CIRCUIT AND ASYNCHRONOUS DIGITAL SIGNAL PROCESSING METHOD

This application is a continuation, of application Ser. No. 08/948,483, filed Oct. 10, 1997, now U.S. Pat. No. 6,038, 259.

FIELD OF THE INVENTION

The present invention relates to an asynchronous digital system and an asynchronous digital signal processing circuit and method, which are suitable for various asynchronous digital signal processing such as an asynchronous central processing unit (CPU), an asynchronous digital signal processor (DSP), and an asynchronous register.

BACKGROUND OF THE INVENTION

Conventionally popular digital systems consist of synchronous systems that use clock signals. That is, data read and write timings are controlled by externally providing a storage element such as a register with a clock signal of a specified cycle. Since such a synchronous digital system uses a clock to hide a transient phenomenon associated with changes in the signal, logic design is simple and can be automated easily.

However, the synchronous digital system, which distributes a clock throughout the system, has various problems as described below.

First, in the synchronous digital system, a clock skew problem must be considered. The clock skew is the absolute value of the difference between the time required by a clock to reach one element and the time required by the clock to reach another element. If the value of the clock skew is large, data is not transferred correctly, thereby causing malfunction. If, for example, a clock for a source latch arrives faster than a clock for a destination latch, output data from the source latch is changed before the data is loaded into the destination latch, resulting in malfunction. On the contrary, if the clock for the destination latch arrives faster than the clock for the source latch, the destination latch takes output data from the source latch before the data has been updated, so the destination latch takes the same data twice, resulting in malfunction. Thus, to prevent timing faults, a sufficiently long clock cycle must be used for the synchronous digital system considering the time for data signals to propagate through elements, the time for data signals to reach elements in the next stage, and setup time.

Second, even if the processing speed of elements is increased, the synchronous digital system cannot obtain the benefits of the fast processing. Due to the recent significant improvement of semiconductor and integrated circuit techniques, the processing speed of elements has been improved, while the scale of the overall system has been increased. Consequently, instead of element delay, which is a conventional problem, wiring delay is becoming a dominant factor in design. The synchronous digital system using a clock cannot reduce the wiring delay easily, so even if faster elements are developed in the future, it will be difficult to improve system performance using these elements.

Third, the synchronous digital system cannot reduce power consumption easily because a clock is distributed throughout the system to instantaneously and simultaneously change the system. Thus, it is difficult to sufficiently meet the demand in the market for the reduction of power consumption in various portable digital systems, such as portable information terminals and cellular telephones.

Fourth, the synchronous digital system is relatively easily affected by a change in environment such as power supply voltage or ambient temperature. That is, if the processing speed of elements is varied due to a change in environment such as voltage or temperature, the timing with the clock may become incorrect, may possibly result in malfunction. As a result, the synchronous digital system requires environment management costs for a voltage control circuit and a CPU cooler.

On the other hand, asynchronous digital systems, which do not use a clock, are also known. In 1940s, when computers were first developed, asynchronous processors using vacuum tubes and relays were developed. Asynchronous digital systems are event-driven and finish the current processing before executing the subsequent processing.

Thus, due to the capability of executing subsequent processing without waiting for arrival of a clock signal, the asynchronous digital system can obtain the benefits of faster elements. In addition, in the asynchronous digital system, since a signal transition only occurs at a required time in a required place, power consumption can be significantly reduced using CMOS·LSIs that require little power consumption if there is no signal transition. Furthermore, due to the unlikeliness to be affected by unpredictable delay variations, the asynchronous digital system can tolerate changes in environment, reduce environment management costs, and obtain stable operations under ultimate conditions, for example, in space or an abyss.

If a signal transition occurs out of a specified timing range, that is, if a timing fault occurs, the circuit may possibly malfunction. Thus, in designing a digital system, whether synchronous or asynchronous, reasonable assumptions must be made on the delay in elements or wiring and a correctly operating circuit must be designed based on these assumptions by considering device technologies, logic design methods, layout methods, packaging methods, and system operation environment used.

If a pessimistic delay assumption is made on possible delay variations, the constraints on the delay will be reduced during technology mapping or layout, while the amount of circuits is increased and the speed is reduced. Conversely, if an optimistic delay assumption is used, strict constraints must be followed during technology mapping or layout. Of course, if the nature of the device used is not compatible with the delay assumption, then reliability, the amount of circuits, and the easiness of design are all affected.

The most pessimistic delay assumption is a delay insensitive (DI) model assuming that wiring and element delays are finite but that their upper limits are unknown. In the DI model, however, it is known that the use of only branching and a single-output element cannot constitute a practical circuit.

An arbitrary practical circuit can be configured by adding to the DI model the assumption that the difference in the time for a signal to reach each branched portion can be neglected if the wiring is branched. This is called the quasi-delay insensitive (QDI) model.

The asynchronous digital system is described in detail in, for example, (1) T. Nanya, "Asynchronous Processors—Toward High-performance VLSI Systems," Information Processing, vol 134, no.1, pp. 72–80, January, 1993, (2) S. B. Furber, P.Day, J. D. Garside, N. C. Paver, and J. V. Woods, "AMULTE1: A micropipelined ARM," in Proc. IEEE Computer Conf., pp. 476–485, March 1994, (3) T. Nanya, Y. Ueno, H. Kagotani, M. Kuwako, and A. Takamura, "TITAC: Design of quasi-delay-insensitive microprocessor," IEEE Design & Test of Computers, vol.11, no.2, pp.50–63, 1994, (4) Y. Ueno, A. Takamura, K. Ozawa, H. Kagotani, M. Kuwako, and T. Nanya, "Design and Evaluation of Asynchronous Processor TITAC" IEICE Technical Report, FIS94-26, April 1994, (5) Y. Ueno, A. Takamura, and T. Nanya, "Delay Insensitivity of Asynchronous Processor TITAC," 1995 IEICE National Meeting 1, no. D-140, March 1995.

The conventional asynchronous digital system described above uses the DI or the QDI model as a delay assumption for the overall system. If elements with a very large fanout or wires extending over a chip from edge to edge are required, it is appropriate to assume that the upper limit of the delay in such elements or wires is unknown.

The system, however, has a very small number of elements with a very large fanout or wires extending over a chip from edge to edge. For most of the remaining elements or wires, it can be assumed that the extent of delay variations can be predicted by imposing appropriate constraints during technology mapping or layout.

That is, since the conventional technique that uniformly applies the QDI model to the overall system always confirms the completion of the current processing before executing the subsequent processing, the system can operate stably to achieve high reliability even if actual delay is substantially varied by a change in temperature or the like. The asynchronous digital system according to the conventional technique, however, requires the time to confirm the completion of processing, so the processing speed may be reduced compared to the synchronous digital system.

SUMMARY OF THE INVENTION

This invention is provided in view of these problems and its object is to provide an asynchronous digital system, an asynchronous data path circuit, an asynchronous digital signal processing circuit and an asynchronous digital signal processing method that can improve the processing speed while maintaining high reliability.

To achieve this object, an asynchronous digital system according to this invention improves processing speed while maintaining sufficient reliability by introducing a new delay assumption.

BRIEF DESCRIPTION OF THE DRAWINGS

FIG. 4 is an explanatory drawing showing a delay variation rate and a timing margin.

FIG. 6 is an explanatory drawing showing two types of methods for adding timing information to data flowing through an asynchronous digital system.

FIG. 8 shows a combinational circuit.

FIG. 9 shows a new combinational circuit that can execute an idle phase in the former half and an idle phase in the latter half in parallel.

DESCRIPTION OF SYMBOLS

Figure 1:
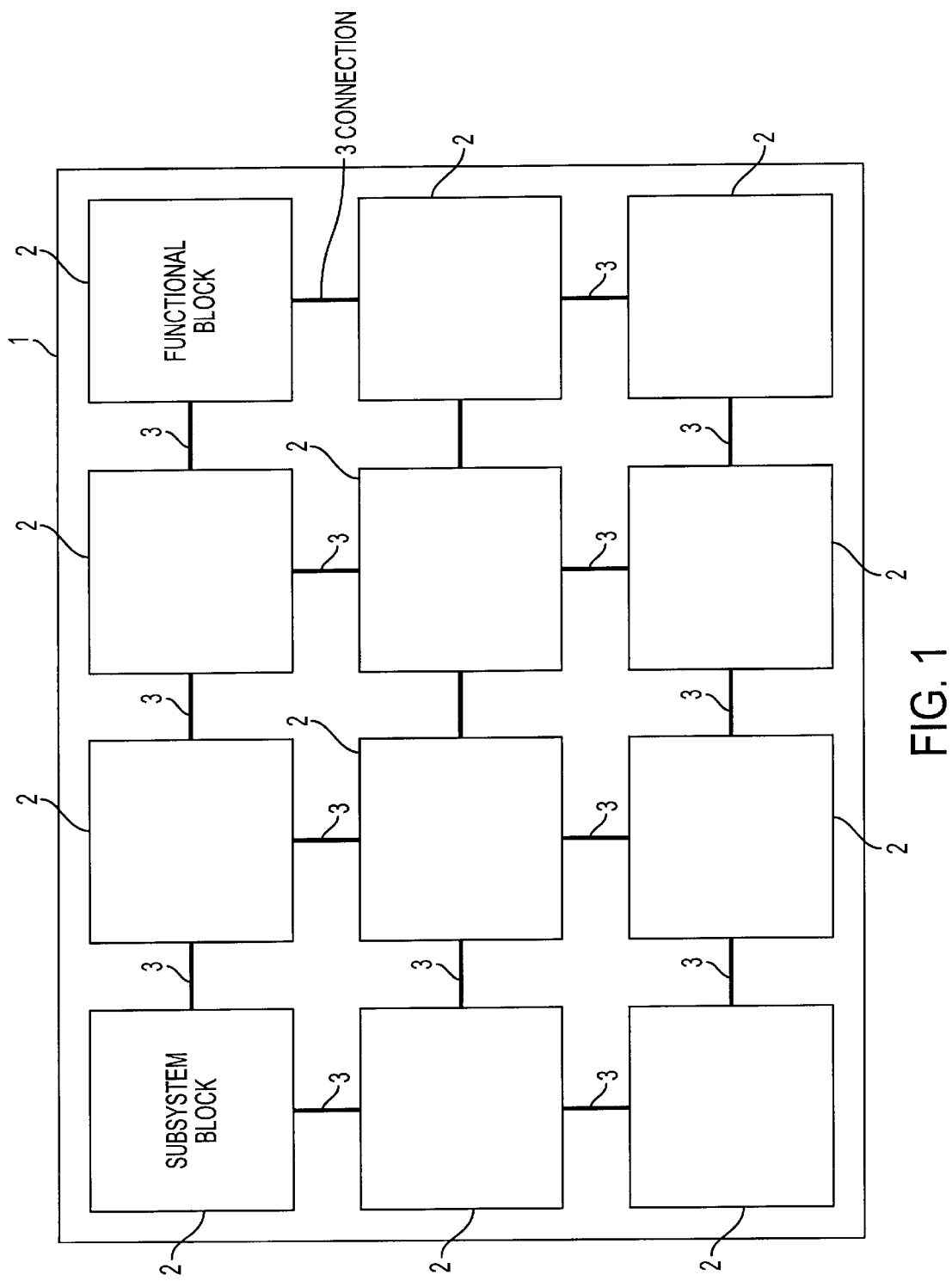
FIG. 1 is an explanatory drawing showing the configuration of a chip according to this embodiment.

1 . . . Chip
2 . . . Block
3 . . . Connection
4 . . . Logic element
5 . . . First subcircuit
6 . . . Second subcircuit
7 . . . First subcircuit
8 . . . Second subcircuit
11 . . . One-bit register
21 . . . Write completion signal generation circuit based on QDI model
31 . . . Write completion signal generation circuit based on SDI model
41 . . . Source latch
42 . . . Destination latch
43 . . . Combinational circuit
44 . . . Control circuit
51$f$ . . . Former half of combinational circuit
51$g$ . . . Latter half of combinational circuit

DETAILED DESCRIPTION OF THE INVENTION

The present invention provides an asynchronous digital system for processing signals without using synchronizing signal called a clock distributed throughout the system, wherein the system is divided into a plurality of subsystems each having an area which does not exceed a specified area, in that the interconnection between the subsystems is formed by applying thereto a first delay model assuming that its upper limit value of the delay is unknown, and each of the subsystems is formed by applying thereto a second delay model assuming that the upper limit of the delay is unknown but the upper limit value of the ratio of the variation rates of two arbitrary delays is known.

Normal synchronous digital systems distribute a synchronizing signal called the clock signal throughout the system to instantaneously and simultaneously change the state of the circuit, whereas normal asynchronous digital systems do not use such a clock signal but must confirm the completion of the current processing before the subsequent processing can be executed. Since, however, the arrival of data from the current processing must be confirmed before the subsequent processing can be executed, a circuit for the confirmation is required which may possibly prevent the improvement of the processing speed.

The first delay model assuming that the wiring and the element delays are finite but their upper limit values are unknown includes, for example, the DI model and the QDI model. Since the delay upper limit values are considered to be unknown in the first delay model, the completion of the current processing is confirmed before executing the subsequent processing. The interconnection between the subsystems is formed by applying the first delay model thereto.

That is, the wiring between the subsystems is designed to operate if its delay upper limit value is assumed to be unknown. Thus, stable operation can be guaranteed even if, for example, long wires extending over a chip from edge to edge are present.

The second delay model assuming that the upper limit value of the delay is unknown but the upper limit value of the ratio of two arbitrary delay variation rates is known, and is called a scalable delay insensitive (SDI) model. In the SDI model, it is assumed that the delay is unknown but that when two certain delays are noted, the width of the relative variation of these two delays has an upper limit. The inside of each subsystem is formed according to the second delay model. The processing speed can be improved by executing logic design based on a second delay model that is more optimistic than the first delay model.

As described above, this invention uses the second optimistic delay model to provide logic design inside each subsystem, whereas it uses the first pessimistic delay model to provide logic design between the subsystems. This configuration improves the processing speed while maintaining reliability.

The present invention further provides an asynchronous digital system for processing signals without using synchronous signals distributed throughout the system, wherein the system comprises circuit components having an assumed delay in which if the implementation of a function requires that a first signal transition (a) occurs to cause a second signal transition (b) and a third signal transition (c) and that the second signal transition (b) precedes the third signal transition (c), $k \cdot Tab < Tac$ is established wherein Tab is the time from the occurrence of the first signal transition (a) until the occurrence of the second signal transition (b), Tac is the time from the occurrence of the first signal transition (a) until the occurrence of the third signal transition (c), and (k) is a constant which is a real number larger than 1.

If the implementation of a function requires that the first signal transition (a) occurs to cause the second signal transition (b) and the third signal transition (c) and that the second signal transition (b) precedes the third signal transition (c) (signal transition (a)→signal transition (b)→signal transition (c),) the system comprises circuit components having such an assumed delay that time Tac is (k) times as long as time Tab.

The assumed delay refers to a delay assumed during logic design. The establishment of $k \cdot Tab < Tac$ means that the causal sequence required to implement the function (the second signal transition (b) precedes the third signal transition (c)) is not disturbed even if, in an actual operating environment, the delay in the signal transition propagation path from the first signal transition (a) to the second signal transition (b) is (k) times as slow as the assumed value Tab during design or if time Tac is reduced to 1/k of time Tab.

The phrase "if the implementation of a function requires" means that a signal transition is required to implement a function required of the system. For example, in the case of a write completion signal indicating that a data write to a register has been completed, this write completion signal is insignificant unless it occurs after a data write to the register has been completed. In this case, for example, a signal transition indicating that data has arrived at the register corresponds to the first signal transition (a), a signal transition caused by a write of the arrived data corresponds to the second signal transition (b), and a signal transition indicating that the write to the register has been completed corresponds to the third signal transition (c). However, it is also contemplated that, for example, a signal transition indicating data has been output from a source register corresponds to the first signal transition (a), that a signal transition indicating that data has been output from a destination register corresponds to the second signal transition (b), and that a signal transition indicating that a write to the destination register has been completed corresponds to the third signal transition (c).

Since the second signal transition (b) precedes the third signal transition (c) even if delay time Tab assumed during logic design actually becomes (k) times larger or if the other delay time Tac is reduced to 1/k of time Tab, the causal sequence required to implement the function is maintained, thereby guaranteeing the operation of the system. In other words, once the first signal transition (a) has occurred, the generation of the third signal transition (c) can be started without confirming the generation of the second signal transition (b).

If, for example, the ambient temperature or the power voltage varies, both delay times Tab and Tac are varied in response to this environmental variation due to the variation of the resistance value or the processing speed of elements. Since delay times Tab and Tac, however, simultaneously increase or decrease (because they vary in the same direction), relationship $k \cdot Tab < Tac$ is not disturbed. As a result, the processing is increased while high reliability is maintained.

Constant (k) is defined as a real number larger than 1. If k=1, then Tab<Tac but this only defines the causal sequence between delay times Tab and delay time Tac and does not include the variation of Tab and Tac. The introduction of constant (k) larger than 1 guarantees stable operations even if Tab increases by (k) times or Tac decreases to 1/k.

The present invention further provides an asynchronous digital system for processing signals without using synchronous signals distributed throughout the system, wherein the system is divided into a plurality of subsystems, and each of the subsystems comprises circuit components having an assumed delay in which if the implementation of a function requires that a first signal transition (a) occurs to generate a second signal transition (b) and a third signal transition (c) and that the second signal transition (b) precedes the third signal transition (c), $k \cdot Tab < Tac$ is established wherein Tab is the time from the occurrence of the first signal transition (a) until the occurrence of the second signal transition (b), Tac is the time from the occurrence of the first signal transition (a) until the occurrence of the third signal transition (c), and (k) is a constant which is a real number larger than 1.

According to this invention, the overall system is divided into a plurality of subsystems, each of which comprises circuit components having an assumed delay in which $k \cdot Tab < Tac$ is established as in the system as described just above. That is, a chip (system) is divided into a plurality of blocks (subsystems) to restrain the delay variation in each block and to apply the above second delay model to each block. The conventional delay model assuming that the upper limit value of the delay is unknown (the first delay model) is preferably applied to the interconnection between the subsystems. This configuration can guarantee stable operations even if a long path is present.

Data flow through the above system according to the present invention comprises temporal information.

The synchronous digital system using a clock signal can use a clock signal cycle that is sufficient in terms of clock skew and propagation time in order to guarantee reliable data transfer. That is, the cycle of the clock signal is set so that if a clock signal arrives at any element, data is valid at that point of time. Since, however, the asynchronous digital system uses no clock signals, another means must be used to detect the arrival of data. Thus, the data flow through the system includes temporal information. The temporal information refers to timing information indicating when data has been generated, moved, converted, or stored.

Specifically, the data can be encoded so as to include the temporal information.

If, for example, two signal lines are used for representing one bit, and if data "0" is encoded as (0, 1), data "1" is encoded as (1, 0), and the absence of data is encoded as (0, 0), then the signal transition from (0, 0) to (0, 1) can be detected as the arrival of data "0" and the signal transition from (0, 0) to (1, 0) can be detected as the arrival of data "1". Encoding is also possible by adding $\log_2 n$ signal lines (redundant bits) to n-bit data.

The method for including temporal information in data is not limited to the encoding of data as described above but may be implemented by adding only one signal line indicating temporal information to data lines with an arbitrary number of bits. The method for assigning one signal line for temporal information to a plurality of data lines can be derived from the data having temporal information as mentioned above.

An asynchronous data path circuit used in an asynchronous digital system according to the present invention comprising circuit components having an assumed delay in which if the implementation of a function requires that a first signal transition (a) occurs to generate a second signal transition (b) and a third signal transition (c) and that the second signal transition (b) precedes the third signal transition (c), $k \cdot Tab < Tac$ is established wherein Tab is the time from the occurrence of the first signal transition (a) until the occurrence of the second signal transition (b), Tac is the time from the occurrence of the first signal transition (a) until the occurrence of the third signal transition (c), and (k) is a constant which is a real number larger than 1, is characterized in that encoded data is transferred by alternatively executing a working phase and an idle phase, in that the asynchronous data path circuit is divided into a plurality of subcircuits, and in that, the idle phase is executed in the subcircuits in parallel by inputting to each of the subcircuits a signal for causing a transfer to the idle phase.

The asynchronous data path circuit according to this invention is preferably used in the asynchronous digital system that uses the newly proposed delay model. The asynchronous data path circuit transfer encoded data by alternatively executing the working and the idle phases.

If, for example, two signal lines are used for one bit, and if data "0" is encoded as (0, 1), data "1" is encoded as (1, 0), and the absence of data is encoded as (0, 0), then the signal transition from (0, 0) to (0, 1) causes data "0" to be transferred and the signal transition from (0, 0) to (1, 0) causes data "1" to be transferred. (0, 0) is called a "spacer," and (0, 1) and (1, 0) are called "valid codewords". The period during the spacer transitions to the valid code word is called the "working phase," and the period during the valid code word transitions to the spacer is called the "idle phase". The method for alternatively executing the working and the idle phases is called a "two-rail two-phase method".

The idle phase is used to initialize the circuit for the next data transfer and is essential. This phase, however, is also wasteful time that does not directly contribute to data transfer. Thus, for example, a data path circuit such as a combinational circuit is divided into one subcircuit for the former half and another subcircuit for the latter half, and a signal for causing a transfer to the idle phase is input to each of the subcircuits. Consequently, each of the subcircuits executes the idle phase in parallel, so the time for the idle phase can be reduced to half.

According to this invention, an asynchronous digital signal processing circuit for processing input data d1 to generate new data d2 includes a completion signal generation circuit for generating a completion signal indicating that the new data d2 has become valid, and the completion signal generation circuit comprises circuit components having an assumed delay in which $k \cdot Td < Ts$ is established wherein Td is the time since the input data d1 becomes valid until the new data d2 becomes valid, Ts is the time since the input data d1 becomes valid until the completion signal is generated, and (k) is a constant which is a real number larger than 1.

For example, input data d1 is converted, stored, or transferred to generate new data d2. Data d1 and data d2 may be the same eventually, but data d2 must be distinguished from data d1 because it has been subjected to processing. The asynchronous digital system that uses no clock signals executes event-driven data processing in which the completion of the current processing must be confirmed before the subsequent processing can be executed, so a completion signal indicating the completion of processing is required. Thus, the asynchronous digital signal processing circuit used for the asynchronous digital system must include a completion signal generation circuit for generating the completion signal.

Then, the completion signal generation circuit is formed of circuit components having an assumed delay in which time Ts until the generation of a completion signal is longer than time Td from the processing of input data d1 until the generation of data d2 multiplied by (k). Thus, when data d1 is input, the generation of a completion signal can be started without confirming that data d2 has become valid.

According to this invention, an asynchronous digital signal processing method for causing a first signal transition (a) to generate a second signal transition (b) and generating a third signal transition (c) that is to occur after the second signal transition (b), is characterized in that the generation of the third signal transition (c) is started when the generation of the first signal transition (a) is confirmed if $k \cdot Tab < Tac$ is established wherein Tab is the time from the occurrence of the first signal transition (a) until the occurrence of the second signal transition (b), Tac is the time from the occurrence of the first signal transition (a) until the occurrence of the third signal transition (c), and (k) is a constant which is a real number larger than 1.

If the first signal transition (a) occurs to cause the second and the third signal transitions (b) and (c) and if the second signal transition must precede the third signal transition (c), the normal asynchronous digital signal processing method must confirm the occurrence of the second signal transition (b) before starting the generation of the third signal transition (c).

For example, a data write to a register is considered. If the arrival of data at the register corresponds to the first signal transition (a), a data write to the register corresponds to the second signal transition (b), and the generation of a completion signal indicating the completion of a data write corresponds to the third signal transition (c), then the third signal transition (c) indicating the completion of a write must follow the signal transition (b) indicating a data write. This is a causal sequence required to implement the function because the subsequent processing must be carried out based on old data if the third signal transition (c) precedes the second signal transition (b).

Thus, the conventional method using a pessimistic delay model confirms the generation of the second signal transition (b) before generating the third signal transition (c). If, however, k·Tab<Tac is established between the delay associated with the second signal transition (b) and the delay associated with the third signal transition (c), the second signal transition (b) is guaranteed to occur earlier than the third signal transition (c) even if the delay in the generation of the second signal transition (b) becomes (k) times as large as the delay assumed during design. In other words, if the time required until the third signal transition (c) occurs is reduced to 1/k, the second signal transition occurs earlier than the third signal transition (c). Thus, in this case, the causal sequence required to implement the function is not disturbed even if the generation of the third signal transition (c) is started without confirming the generation of the second signal transition (b). This configuration eliminates the need for a circuit for confirming the generation of the second signal transition (b). In addition, the third signal transition (c) can be generated promptly, thereby improving the processing speed.

DESCRIPTION OF THE PREFERRED EMBODIMENTS

The embodiments of this invention are described in detail with reference to FIGS. 1 to 9. FIG. 1 is an explanatory drawing schematically showing the overall asynchronous digital system according to an embodiment of this invention.

1. Global and Local Delay Assumptions

For example, a chip 1 such as an LSI is divided into a plurality of blocks 2, which are coupled together by connections 3. Each block 2 is configured to have a predetermined area. The predetermined area is determined by the upper limit value (k) of the ratio of delay variation rates.

An SDI model is applied to the inside of each block 2 as a "second delay model". It should be noted that a DI or a QDI model is applied to the connections 3 between the blocks as a "first delay model". Unlike the known DI or QDI model that is applied to the overall chip 1 as in the prior art, the newly developed SDI model is used for the blocks 2 that are divided so as to have the predetermined area.

The DI (Delay Insensitive) model assumes that the wiring and the element delays are finite and that their upper limit values are unknown. It is known, however, that the Di model does not allow a practical circuit to be configured if only branching and single-output elements are used (A. J. Martin, "The limitations to delay-insensitivity in asynchronous circuits," in Sixth MIT Conf. On Advanced Research in VLSI, pp. 263–278, 1990). If the assumption that "the difference of wire delays in any two of the branches in a forking interconnection can be neglected" is added to the DI model, an arbitrary practical circuit can be configured. This is called the "QDI (Quasi Delay Insensitive) model".

2. DI and QDI Models

Figure 2:
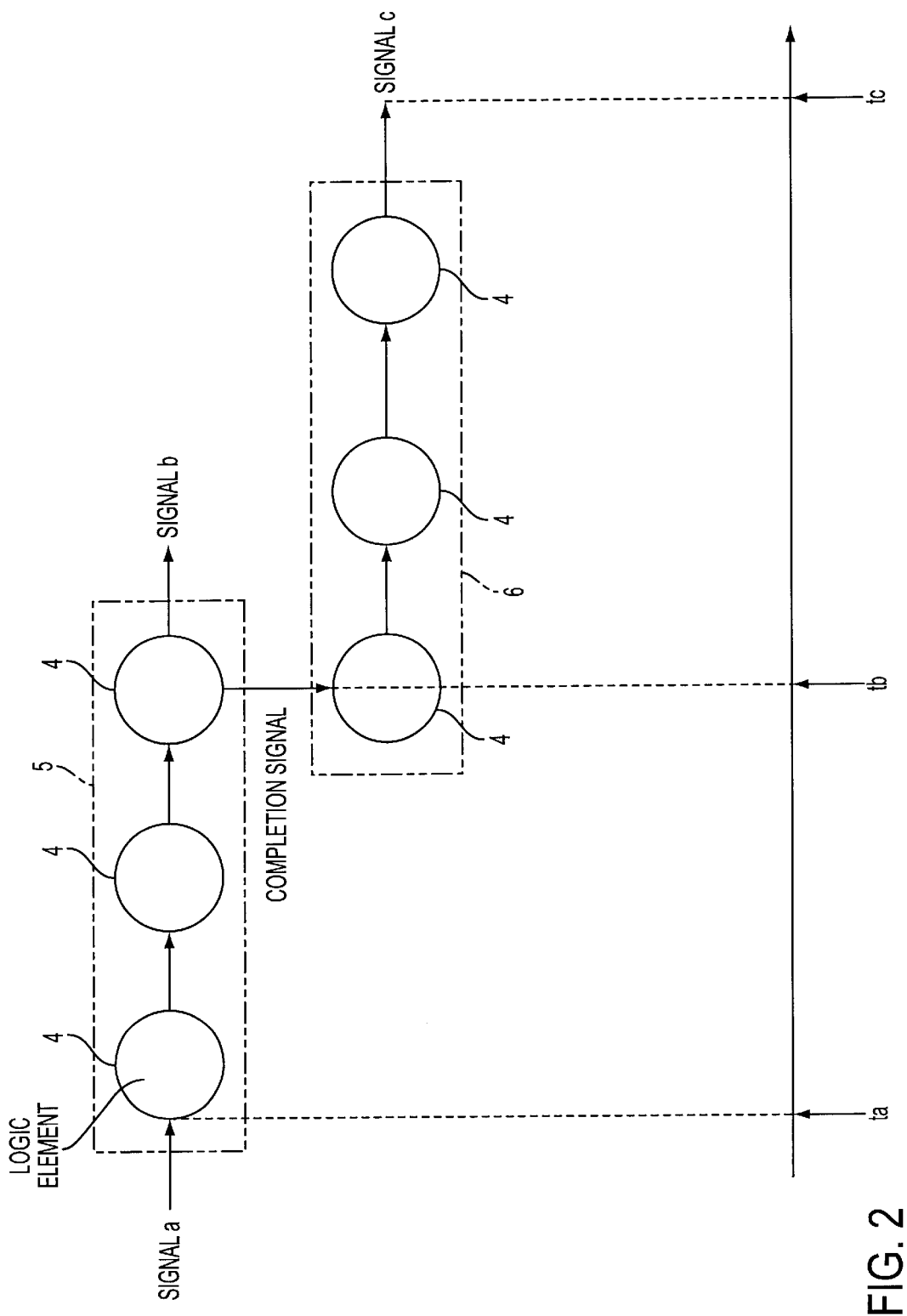
FIG. 2 is an explanatory drawing showing the concept of a conventional DI or QDI model.

FIG. 2 is a conceptual drawing showing a conventional DI or QDI model. The conventional delay model assumes that the wiring and the element delays are finite but unbounded. Thus, in this delay model, the completion of the current processing must be confirmed before the subsequent processing can be executed.

Subcircuits 5 and 6 are each composed of a plurality of logical elements 4. The first subcircuit 5 generates a signal (b) when a signal (a) is generated. The subcircuit 6 generates a signal (c) after the signal (b) has occurred. To implement this function, the signal (c) must follow the signal (b). Thus, on receiving from the subcircuit 5 a completion signal indicating the generation of the signal (b), the subcircuit 6 generates the signal (c). The signal (b) may be the completion signal.

Thus, if the signal (a) becomes valid at time ta, the signal (b) becomes valid at time tb and the signal (c) is formed at time tc.

3. SDI Model

Figure 3:
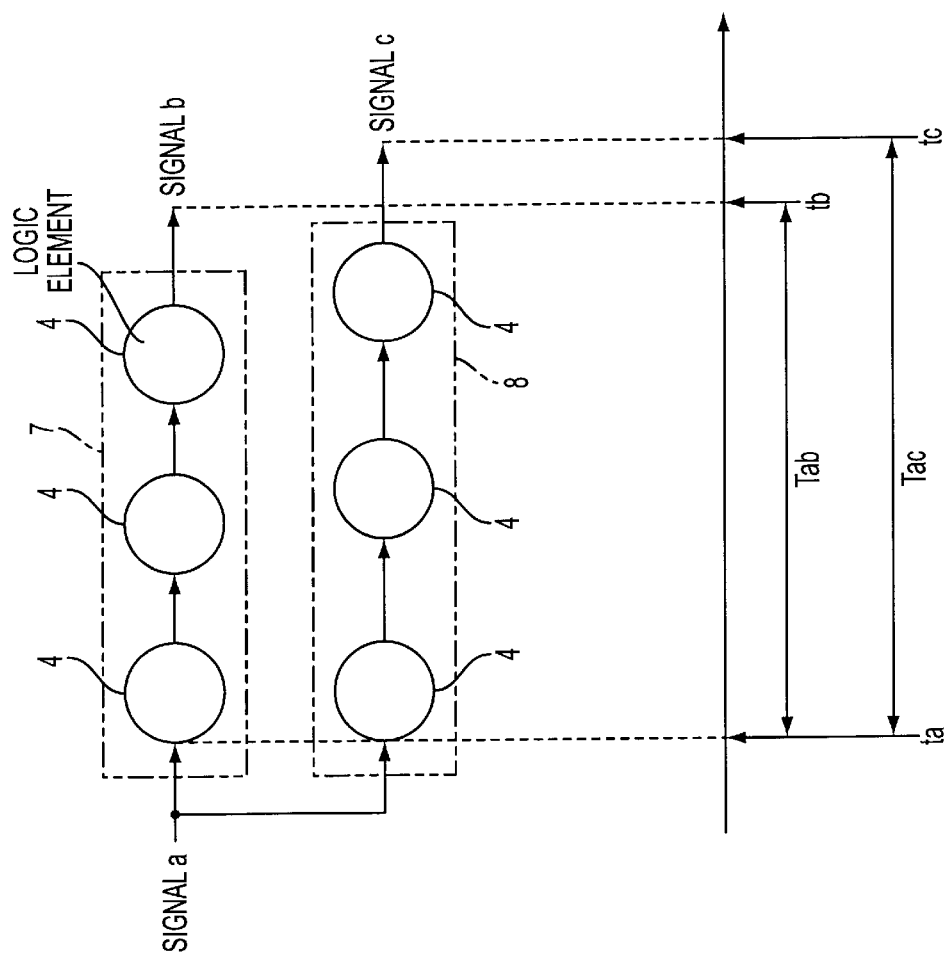
FIG. 3 is an explanatory drawing showing the concept of a newly proposed SDI model.

Next, FIG. 3 is a conceptual drawing showing an SDI (Scalable Delay Insensitive) model characteristic of this invention.

As in FIG. 2, subcircuits 7 and 8 are each composed of a plurality of logical elements 4. The first subcircuit 7 receives the signal (a) to cause the signal (b) to be generated. The second subcircuit 8 receives the signal (a) to cause the signal (c) to be generated. The signal (b) must precede the signal (c).

The SDI model assumes that "the upper limit value of the delay is unknown but that the upper limit value of the ratio of the variation rates of any two delays." Each subcircuit 7 and 8 shown in FIG. 3 is designed to have an assumed delay in which k·Tab<Tac is established when Tab is the time from time ta to time tb, Tac is the time from time ta to time tc, and (k) is a constant which is a real number larger than 1.

The operation of the circuit shown in FIG. 3 is guaranteed by designing each circuit 7 and 8 so as to have an assumed delay that meets k·Tab<Tac because the signal (c) follows the signal (b) even if the path assumed during logic design to occur earlier (signal (a)→signal (b)) actually occurs later than the path assumed during design to occur later (signal (a)→signal (c)) by (k) times. Thus, on confirming the generation of the signal (a), the subcircuit 8 starts generating the signal (c) without confirming the generation of the signal (b). This configuration eliminates the need for a circuit for confirming the generation of the signal (b), thereby improving the processing speed.

3-1. Delay Variation Rate

Figure 4A:
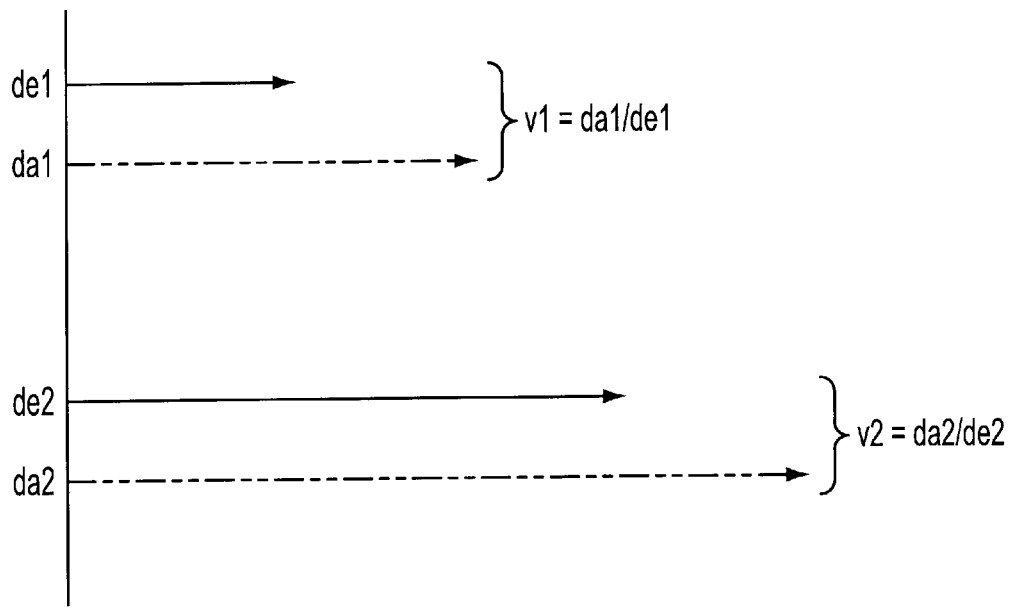
FIG. 4(a) is an explanatory drawing showing the variation of delay and FIG. 4(b) is an explanatory drawing showing the timing margin.

FIG. 4(a) shows the assumed and measured values of two delays. The direction of the horizontal axis represents time. As shown in FIG. 4(a), assumed value de of a certain wiring or element delay (a value predicted during logic design) differs from actual value da. The actual delay da is finite but its upper limit value is unknown.

Actual delay da divided by assumed value de is delay variation rate (v) (v=da/de). In this case, the delay assumption that "the upper limit value of ratio v2/v1 of variation rates v1 and v2 of any two delays (v2>v1) is known" is called a "scalable delay insensitive" (SDI) model.

3-2. Timing Margin

Next, timing margin is described with reference to FIG. 4(b). The timing margin used herein means a measure for quantitatively evaluating the unlikeliness of timing faults. The timing fault is the occurrence of a signal transition with a timing out of the specified range.

Figure 4B:
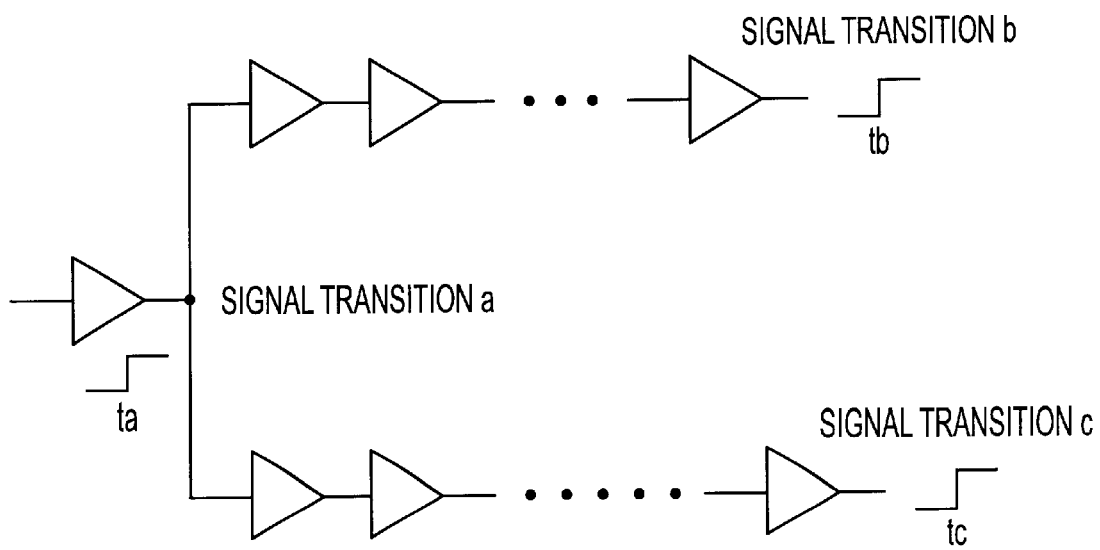

As shown in FIG. 4(b), the timing fault is defined as follows in a circuit in which a gate activated by an output transition from another gate is expressed as a buffer.

In a circuit in which a specification states that a signal transition (c) follows a signal transition (b), the signal transition that causes both signal transitions (b) and (c) is referred to as (a). When the time at which each signal transition is assumed to occur is referred to as ta, tb, and tc, (tc−ta)/(tb−ta) is called a "timing margin". The wiring and the element delays that are used as bases to assume ta, tb, and tc are determined so as to match the characteristics of the device actually used.

If the timing margin is (m), this intuitively means that no timing fault occurs even if the signal propagation delay in a path that is assumed during design to be small is actually larger by (m) times. The timing margin of a circuit in which the upper limit value of ratio v2/v1 of delay variation rates is assumed to be (k) is (k) or more. This is because the operation is designed to be guaranteed even if the signal propagation in a path that is assumed during design to be fast becomes slower by (k) times compared to a path assumed to be slow.

When (tc−ta) is represented as Tac and (tb−ta) is represented as Tab, the timing margin (m) can be represented as m=Tac/Tab. Since k<m, k<Tac/Tab and k·Tab<Tac can be derived.

4. Determination of an Area in Which the SDI Model is Established

Upper limit value (k) of the ratio of delay variation rates assumed during logic design is a constraint on technology mapping or layout. In executing a layout, the area of a block 2 to which the delay assumption (the SDI model) is applied must be limited during logic design to meet this constraint.

In laying out a circuit designed under a certain delay assumption, the relationship between reliable timing margin and an area can be predicted if there is sufficient layout data for the same technology. If, however, previous data is insufficient, the length of wiring obtained when the timing margin of a circuit designed based on the SDI model is 1 can be calculated, and, from the results, the area with which the ratio of delay variation rates smaller that set upper limit value (k).

For example, logic design using the assumption that the upper limit value (k) of the ratio of delay variation rates is 2 (k=2) is considered. First, the delay time of a gate obtained when the load on the gate includes a fanout of 3 and a wiring length of 0.48 mm is uniformly used as a standard delay time for logic design. These values are normally used to calculate the standard delay of the gate using a tool used for technology mapping. The wiring delay is considered to be included in the gate delay. Next, if the delay time of a certain gate is twice as long as the above standard delay time when the wiring length is L even if the fanout is 1, the sum of the vertical and horizontal lengths of a single block to be divided must be L. The fanout is set at 1 because no occurrence of timing fault can be guaranteed by setting the fanout at 1 during technology mapping if the wiring delay is large.

Thus, the area of each block 2 shown in FIG. 1 is determined so that the sum of its vertical and horizontal lengths will be L. Therefore, the outer circumferential length of the block 2 is 2L.

Figure 5:
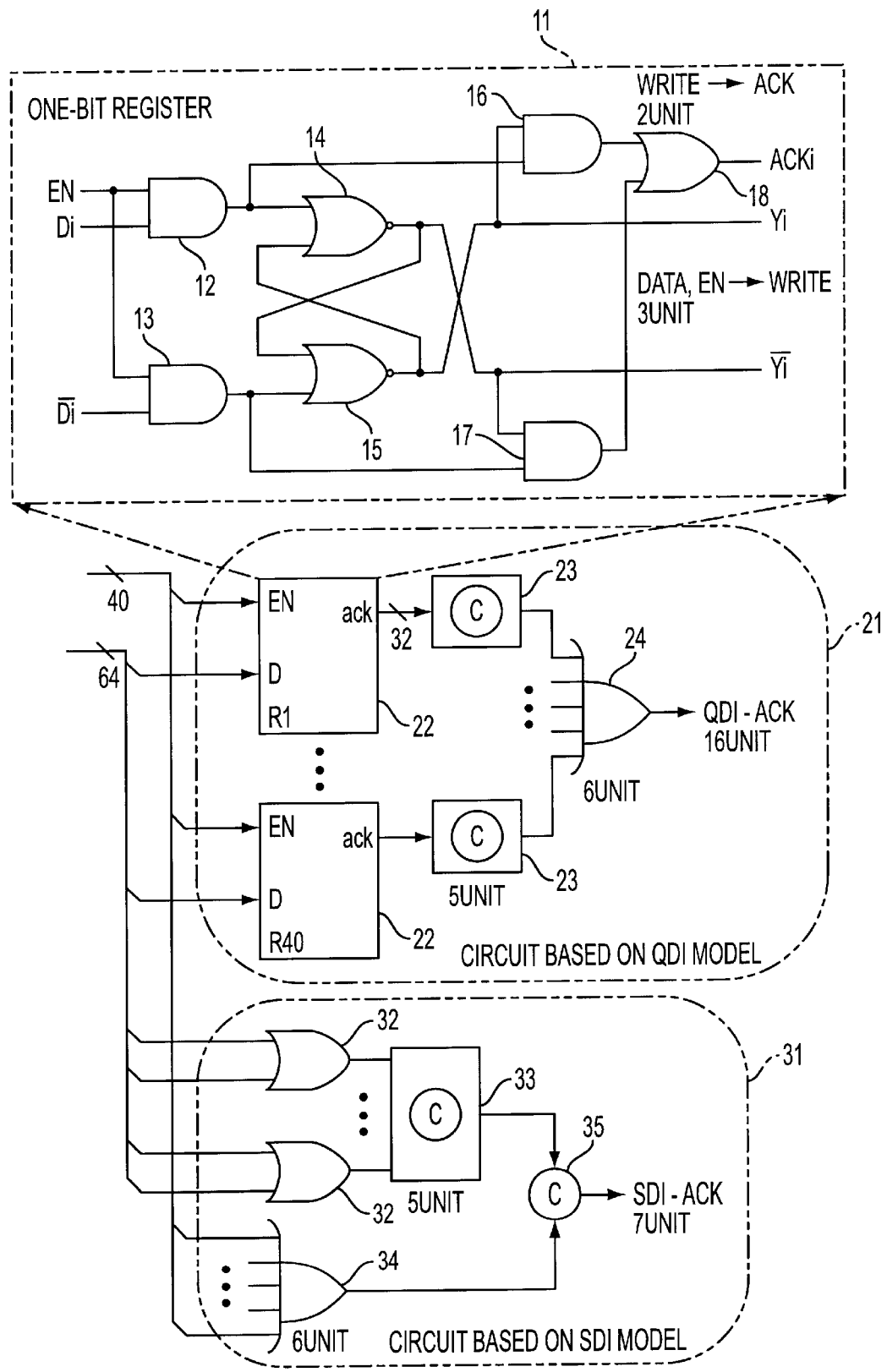
FIG. 5 is a circuit diagram comparing a write completion signal generation circuit based on the QDI model with a write completion signal generation circuit based on the SDI model.

5. Comparison Between a Circuit Based on the QDI Model and a Circuit Based on the SDI Model Next, a circuit to which the conventional QDI model is applied and a circuit to which the present SDI model is applied are compared and described with reference to FIG. 5. FIG. 5 shows a circuit for generating a register file write completion signal.

5-1. Circuit Based on the QDI Model

As shown in the upper part of FIG. 5, a one- bit register 11 comprises a pair of AND gates 12 and 13 and a pair of NOR gates 14 and 15 that are cascade-connected to the AND gates 12 and 13 and the wires of which cross each other; and a circuit for generating a write completion signal ACKi described below.

A select signal EN and data are input to the AND gates 12 and 13, respectively. According to this embodiment, one-bit data is encoded using two signal lines Di and Di bar in order to add timing information to the data. Methods for adding timing information are described below with reference to FIG. 6.

Next, the circuit for generating the write completion signal ACKi indicating that data has been written to the one-bit register 11 is explained. As shown in the upper part of FIG. 5, the outputs of the AND gate 12 and the NOR gate 15 are input to the AND gate 16. Likewise, the outputs of the AND gate 13 and the NOR gate 14 are input to the AND gate 17. The outputs of the AND gates 16 and 17 are input to the OR gate 18. Thus, the write completion signal ACKi can be obtained by confirming the arrival of the select signal and data and also confirming the inversion of the state of the latch.

Next, the middle of FIG. 5 shows a register file write completion generation circuit 21 based on the QDI model. The register file comprises a plurality of registers 22 each of which comprises a plurality of one-bit registers 11. For example, each register 22 can comprise a 32-bit register and the register file can comprises 40 registers 22.

In the figure, the element marked with an encircled C is a so-called Muller's C element that outputs zero when all the inputs are zero, that outputs 1 when all the inputs are 1, and that holds the output if 0 and 1 are mixed in the input. C element 23 is connected to each register 22.

A write completion signal from each register 22 is input to the C element 23. That is, 32 write completion signals from the 32 one-bit registers 11 are input to the C element 23. After confirming that a write has been finished for all the one-bit registers 11, each C element 23 outputs a signal to the OR gate 24 indicating that the write to the register 22 has been finished. Thus, if data is written to selected one of the plurality of registers 22 consisting of R1 to R40, the OR gate 24 outputs a register file write completion signal QDI-ack.

The delay from the arrival of data D and the select signal EN until the generation of the write completion signal QDI-ack is considered. For simplification, it is assumed that all the elements have two inputs and that their delay is one unit time. Thus, the delay in an element with (n) inputs is $\log_2 n$.

A write to the one-bit register 11 is finished 3 unit time after the data D and the select signal EN have arrived. After the write has been finished, two unit time is required before the write completion signal ACKi is generated. Thus, 3 unit time+2 unit time=5 unit time is required from the arrival of the data D and the select signal EN at the one-bit register 11 until the generation of the write completion signal ACKi.

Then, each C element 23 confirms that a write has been finished for all the 32 registers 11. Since there are 32 inputs, 5 unit time is required for the C element 23 to output a signal to the OR gate 24.

Finally, the OR gate 24 confirms that the data has been written to selected one of all the registers 22. If the register file includes for example, 40 registers 22, 6 unit time is consumed.

Thus, the register file write completion signal generation circuit 21 designed under the QDI model requires a circuit for confirming that the data has been written to the one-bit register 11 (required time: 5 unit time), a circuit for confirming that a write has been finished for the 32-bit register 22 (required time: 5 unit time), and a circuit for confirming that the a write has been executed to one of the 40 registers 22 (required time: 6 unit time), thereby consuming 16 unit time in total.

5-2. Circuit Based on the SDI Model

Next, the lower part of FIG. 5 shows a write completion signal generation circuit 31 based on the SDI model characteristic of this invention. The circuit 31 is configured under the assumption that the upper limit value (k) of the ratio of delay variation rates is 2.

The 32-bit data D, which is input to the register file, is input to 2-input OR gates 32 installed so as to correspond to each bit output signals from the 32 OR gates 32 are input to the C element 33. After confirming that the 32-bit data D have arrived, the C element 33 outputs a signal. On the other hand, the select signal EN used to select the register 22 is input to the 40-input OR gate 34. After confirming that the select signal has arrived, the OR gate 34 outputs a signal. The output signals from the C element 33 and the OR gate 34 are input to another C element 35. After confirming that the data D and the select signal EN have arrived, this C element 35 outputs a register file write completion signal SDI-ack.

The circuit 31 using the SDI model generates a write completion signal by confirming the arrival of the data D and the select signal EN. The 2-input OR gate 32 for confirming the arrival of each bit of the data D consumes 1 unit time, the 32-input C element 33 for confirming the arrival of the data D consumes 5 unit time, the 40-input OR gate 34 for confirming the arrival of the select signal EN consumes 6 unit time, and the 2-input C element 35 for confirming the arrival of the data D and the select signal consumes 1 unit time. Consequently, the total delay is 7 unit time, which is the sum of 6 unit time required to confirm each of the select signal EN and the data D and 1 unit time required to confirm the arrival of both the data D and the select signal EN.

The write completion signal generation circuit 31 based on the SDI model confirms only the arrival of the data D and the select signal EN to generate the write completion signal SDI-ack, and does not confirm the actual completion of the write operation as in the circuit 21 based on the QDI model.

However, the timing margin between the time until a write 31 to the one-bit register 11 has been finished (3 unit time) and the time until the write completion signal SDI-ack has been output. (7 unit time) is 7/3, which exceeds the upper limit value (k) (=2) of the ratio of delay variation rates set during design (7/3>2). Thus, even if the delay in a write to the one-bit register 11 is longer than expected, the write completion signal SDI-ack is guaranteed to be output after the write to the one-bit register 11 has been finished.

Specifically, by carrying out logic design on the assumption that the range of the relative delay variation between two paths to be a certain value, for example, k=2 required signals can be generated without confirming the generation of signals which are required in the prior art. In other words, the generation of the signal to be generated later (the register file write completion signal SDI-ack) can be started before confirming the generation of the signal to be generated earlier (the register write completion signal ACKi) once signals that constitute a common cause (the data D and the select signal ACKi) have been generated by carrying out logic design so that the range of the relative variation between two delays with a causal sequence can fall within the specified range.

Consequently, the SDI model improves the processing speed compared to the conventional QDI model. The SDI model can maintain high reliability as in the conventional QDI model.

6. Addition of Timing Information

In the asynchronous digital system, timing information (temporal information) must be added to data to be informed of the arrival of the data. Two methods for adding timing information to data are described with reference to FIG. 6.

6-1 Two-Rail two-Phase Method

Figure 6A:
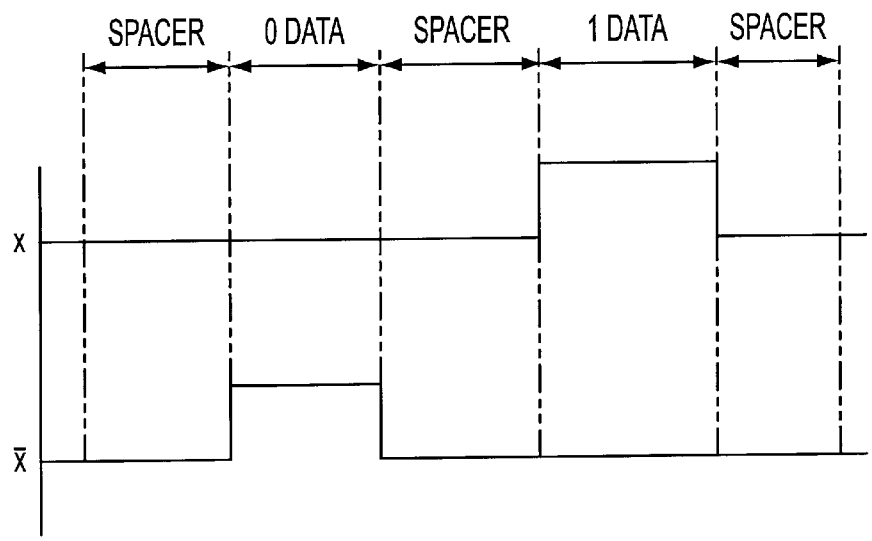
FIG. 6(a) shows a two-rail two-phase method and FIG. 6(b) shows a bundled-data method.

As shown in FIG. 6(a), two signal lines (x, x bar) are used for one bit to represent 0 data as (0, 1) and 1 data as (1, 0). By representing the state where data have not arrived yet as (0, 0), the arrival of 0 data as a transition from (0, 0) to (0, 1), and the arrival of 1 data as a transition from (0, 0) to (1, 0), data can be transferred correctly even if the upper limit of the delay is unknown.

(0, 0) is called a "spacer," and (0, 1) and (1, 0) are called "valid code words". The period of transition from the spacer to a valid code word is called a "working phase," and the period of transition from a valid code word to the space to transfer the next data is called an "idle phase". The method for alternately executing the working and the idle phases to transfer data is called a "two-rail two-phase method".

In this manner, encoding of the data makes it possible to include timing codes indicating when generation, arrival, move, conversion or storage of the data has occurred.

6-2. Bundled-data Method

Figure 6B:
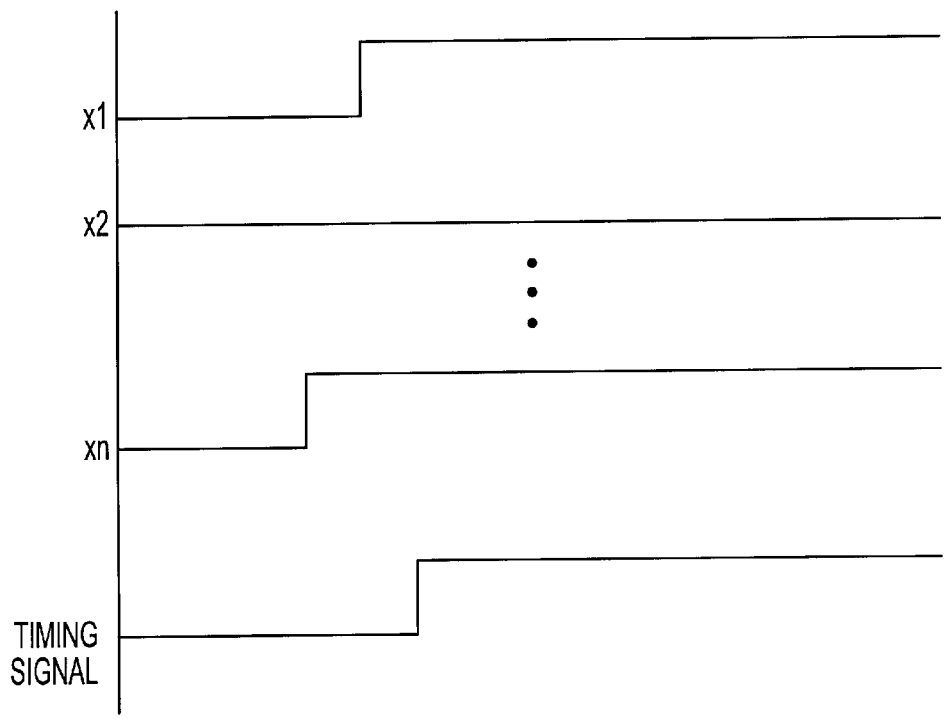

The method for adding a single signal line indicating timing information (referred to as a "timing signal line" herein) to data lines for an arbitrary number of bits as shown in FIG. 6(b) is called a "bundled-data" method. Data is transferred by changing the timing signal line after outputting new data to the data lines. The bundled-data method is advantageous in that a synchronous combinational circuit can be directly used if the element and wiring delays are known. A combinational circuit based on the bundled-data method comprises data lines and one timing signal line. The timing signal line uses a delay element to generate a signal indicating that output data has been determined from a signal indicating that input data to the combinational circuit has been determined.

When design is carried out on the assumption that the upper limit value (k) of the ratio of delay variation rates is 2, the delay in the timing signal must be twice the delay in the data lines or more according to the bundled-data method. On the contrary, since the arrival of the data can be confirmed, circuits based on the two-rail two-line method are often faster than those based on the bundled data method.

Thus, the two-rail two-phase method is more preferable in terms of the processing speed. The bundled-data method, however, is preferable considering that existing components such as an interface to the exterior of the chip 1 and a RAM can be used. When a fast circuit based on the bundled-data method is designed using a fixed delay, a timing margin becomes small. Thus, it is preferable that elements used for the bundled-data method can be externally controlled to maximize the delay in a combinational circuit in order to prevent timing faults.

7. Asynchronous Pipelines

Next, an example of an asynchronous pipeline to which the SDI model is applied is described with reference to FIG. 7.

The pipeline method executes fast processing by dividing the overall processing into several independent stages and executing them in parallel.

An asynchronous pipeline according to this embodiment comprises a source latch 41; a destination latch 42; a combinational circuit 43 installed between the latches 42 and 43; and a control circuit 44 for controlling the flow of data. Data flows through the pipeline using the two-rail two-phase method.

When data arrives from the source latch 41, the combinational circuit 43 executes a calculation and outputs the results of the calculation to the destination latch 42 (at this point, all the inputs need not have arrived). When all the inputs have arrived and the next input can be accepted, a completion signal from the combinational circuit is output to the control circuit 44. The completion signal from the combinational circuit 43 is separated from the output of the results of the calculation to execute in parallel a write of the results to the destination latch 42 and a wait for data input. At this point, if a read is not actually executed on any latch despite a data read request therefor, a next write to this latch is disabled. Thus, the process must wait until all the inputs have arrived even though they are unwanted data.

When data and a data read request signal arrive at the input, the latches 41 and 42 update output data with the input data. Once the update has been finished, a write completion signal is output.

On confirming through a C element 44a that the write completion signal from the destination latch 42 and the completion signal from the combinational circuit 43 have been generated, the control circuit 44 uses an invertor 44b to invert the output from the C element 44a in order to output a read request signal to the source latch 41.

Figure 7:
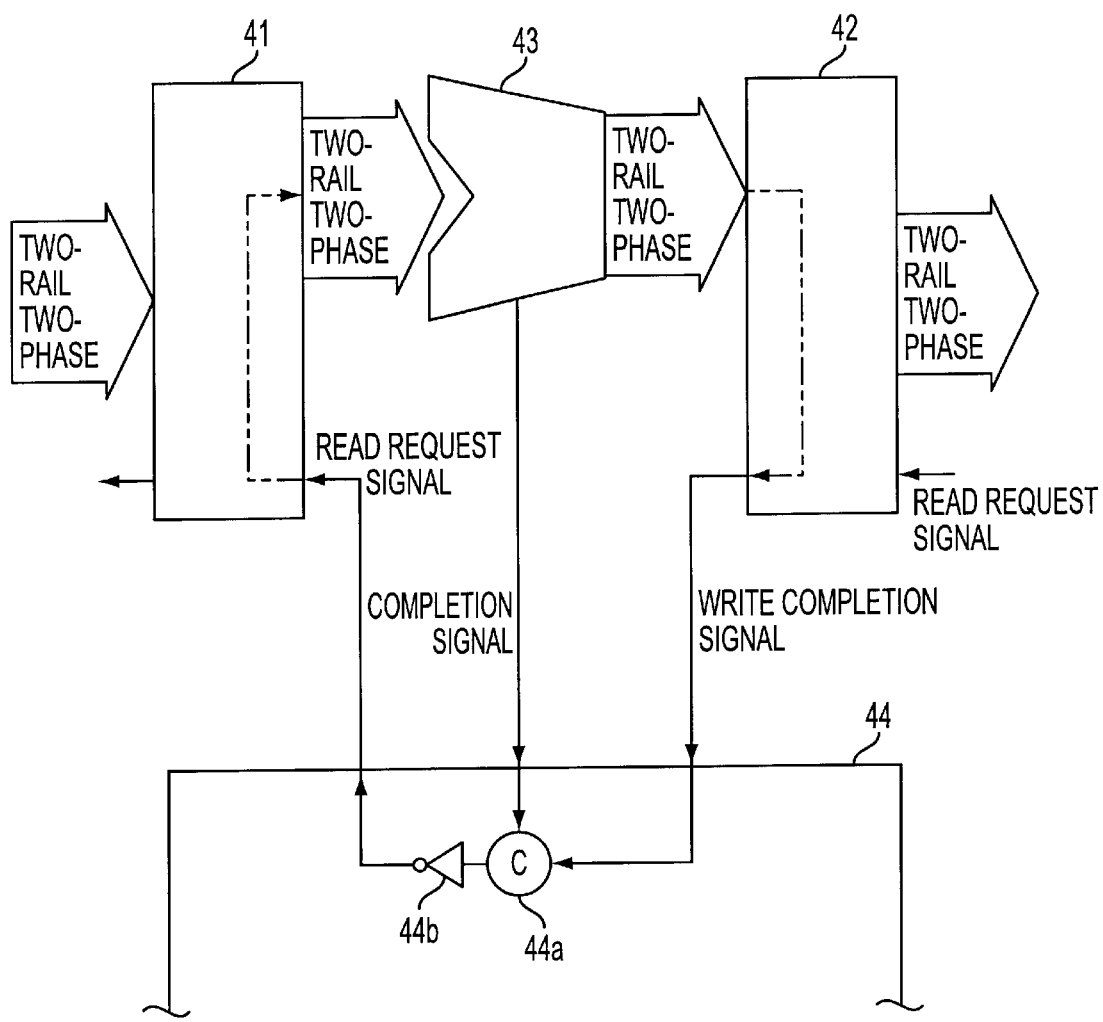
FIG. 7 is an explanatory drawing showing an asynchronous pipeline.

FIG. 7 shows a one-to-one correspondence among the source latch 41, the combinational circuit 43, and the destination latch 42. In general, however, the output from the source latch 41 is shared by a plurality of combinational circuits 43 and a plurality of destination latches 42. In this case, data must be read from the source latch 41 after completion signals have been output from the combinational circuits. Thus, a completion signal from each transfer latch 42 and a completion signal from each conbinational circuit 43 connected to the input of each destination latch 42 are combined in another C element, with the output therefrom used as a write completion signal.

The SDI model shown in FIG. 5 can be applied to the circuit for generating a write completion signal for the latches 41 and 42 and the circuit for generating a completion signal for the combinational circuit 43. This configuration improves the processing speed while maintaining high reliability.

8. Reduction of the Idle Phase Time of a Combinational Circuit 8-1. Conventional Methods In the two-phase data transfer described above, the idle phase is a wasteful period of time in which the circuit is initialized for the subsequent data transfer. One method for reducing the idle phase is to execute the idle phase for an inter-register transfer and the working phase for the subsequent inter-register transfer in parallel to hide the idle phase time.

When, however, this method is applied to the pipeline processing, the combinational circuit must be divided into two to double the number of pipeline stages. Since an increase in the number of pipeline stages increases the delay in the inter-stage latches and the control circuit, the total execution time is not significantly reduced.

Figure 8A:
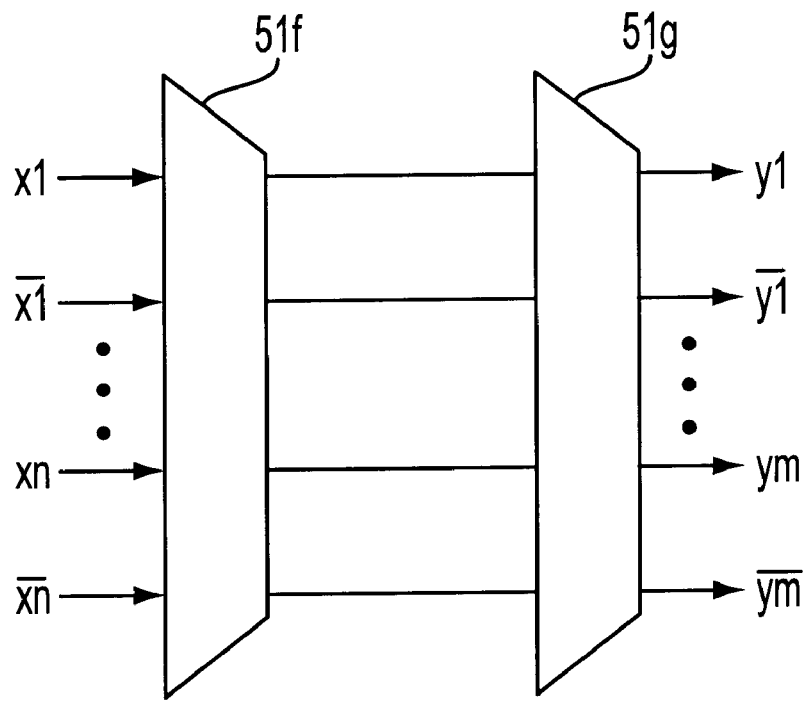
FIG. 8(a) is an explanatory drawing showing a combinational circuit and FIG. 8(b) is a timing chart.
Figure 8B:
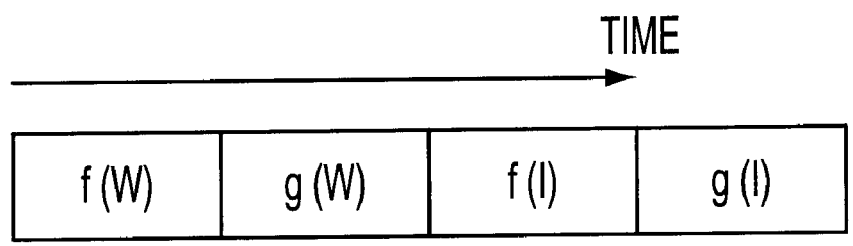

FIG. 8 shows a conventional combinational circuit. As shown in FIG. 8(b), the working and the idle phases are alternately executed in a normal combinational circuit. More exactly speaking, the process proceeds in the order of a working phase f(W) of a combinational circuit 51f in the former part, a working phase g(W) of a combinational circuit 51g in the latter part, an idle phase f(I) of the combinational circuit 51f in the former part, and an idle phase g(I) of the combinational circuit 51g in the latter part.

8-2. New Methods

Figure 9A:
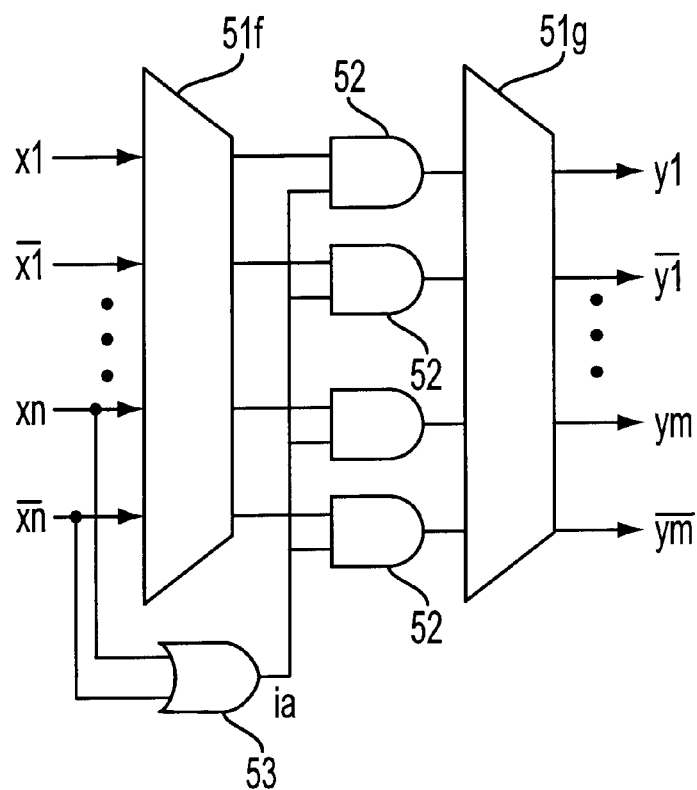
FIG. 9(a) is an explanatory drawing showing a combinatorial circuit and FIG. 9(b) is a timing chart.

FIG. 9 shows a circuit in which the idle phase of a combinational circuit is reduced according to this embodiment. As shown in FIG. 9(a), the combinational circuit is divided into the combinational circuit 51f in the former half and the combinational circuit 51g in the latter half, with AND gates 52 corresponding to respective signal lines inserted between the circuits 51f in the former half and the circuit 51g in the latter half. Among all the inputs to the combinational circuit, one bit of the first signal to arrive (xn and xn bar in the figure) is input to an OR gate 53, the output from which is transmitted to the other input of each AND gate 52.

Figure 9B:
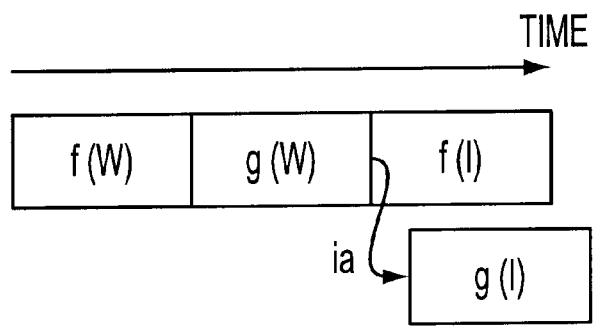

Thus, in the conventional circuit shown in FIG. 8, the idle phase g(I) of the circuit 51g in the latter half is executed after the idle phase f(I) of the circuit 51f in the former half has been executed, whereas according to this embodiment, the idle phase f(I) of the circuit 51f in the former half and the idle phase g(I) of the circuit 51g in the latter half are executed at almost the same time as shown in FIG. 9(b). This is because when an input (x) is changed into the spacer (0, 0) to start the idle phase f(I) of the circuit 51f in the former half, an output is from the OR gate 53 becomes zero to change the output from each AND gate 52 into zero, thereby changing the input to the circuit 5g in the latter half into the spacer.

As a result, this circuit can reduce the execution time of the idle phase to half compared to the combinational circuit using a conventional asynchronous pipeline, thereby improving the processing speed.

This embodiment, which is configured as described above, has the following effects.

First, the chip 1 is divided into the blocks 2 with a specified area, and the intermediate section between the blocks 2 is formed by applying thereto the first delay model (the DI or the QDI model) assuming that the upper limit value of the delay is unknown, and each block is formed by applying thereto the second delay model (the SDI model) assuming that the upper limit value of the delay is unknown but that the upper limit value of the ratio of the variation rates of two arbitrary delays is known. Thus, the processing speed is improved while high reliability is maintained.

Since the conventional asynchronous digital system assumes that the upper limit value of the delay is unknown, the results of the current processing must be checked before executing the subsequent processing. Consequently, the conventional system requires a circuit for confirmation and has a reduced processing speed due to the delay in the start of the subsequent processing. This embodiment, however, focuses on the locality of the circuit and introduces into each block 2 the new delay assumption (the SDI model) assuming that the upper limit value of the ratio of delay variation rates can be considered to be known.

Thus, for example, the amount of circuits for confirmation can be reduced as shown in FIG. 5, thereby improving the processing speed. In addition, since the conventional delay model is used for the connections between the blocks where a significant wiring delay may occur, stable operations can be guaranteed.

Second, since the stable operation of the circuit can be guaranteed even if the delay in an element or a wire increases by (k) times relative to an expected value, this invention is tolerant of the variation of the power voltage or the ambient temperature. The upper limit value of each delay varies depending on the variation of the power voltage or the ambient temperature, but the range of relative variations between two delays to which the SDI model is applied does not vary. Thus, the asynchronous digital system according to this embodiment can operate stably under harsh environment, for example, in an abyss, space, a severely cold area. In other words, in a normal environment, this asynchronous digital system can operate stably without the use of a voltage stabilizing circuit or a CPU cooler. Therefore, it is advantageous in costs.

Third, by adding timing information to data, the two-rail two-phase method enables the detection of the time when data has been generated, moved, converted, or stored.

Fourth, the combinational circuit is divided into the combinational circuit 51f in the former half and the combinational circuit 51g in the latter half, with the detection means (each AND gate 52 and OR gate 53) for detecting the commencement of a transition of the circuit 51f in the former half to the idle phase f(I) installed between the circuit 51f in the former half and the circuit 51g in the latter half so that the idle phase g(I) of the circuit 51g in the latter half is executed. If the detection means detects the transition of the circuit 51f in the former half of the idle phase f(I), the idle phase f(I) of the circuit 51f in the former half and the idle phase g(I) of the circuit 51g in the latter half can be executed in parallel to increase the processing speed. This configuration is useful not only in systems using the SDI model but also in conventional asynchronous digital systems.

9. Logic Design Method Using the SDI Model

Figure 10:
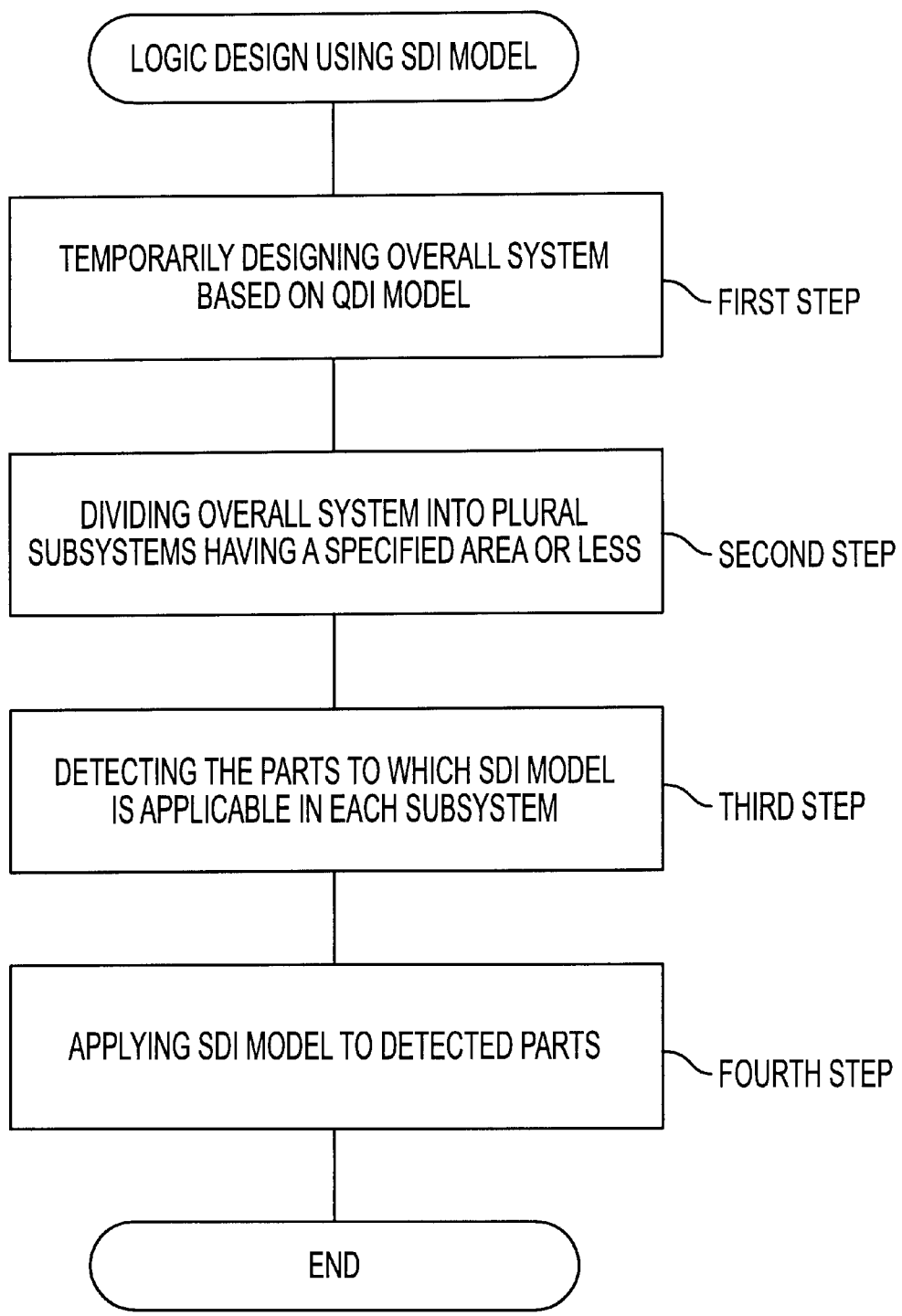
FIG. 10 is a flowchart schematically showing logic design flow using the SDI model.
Figure 1:
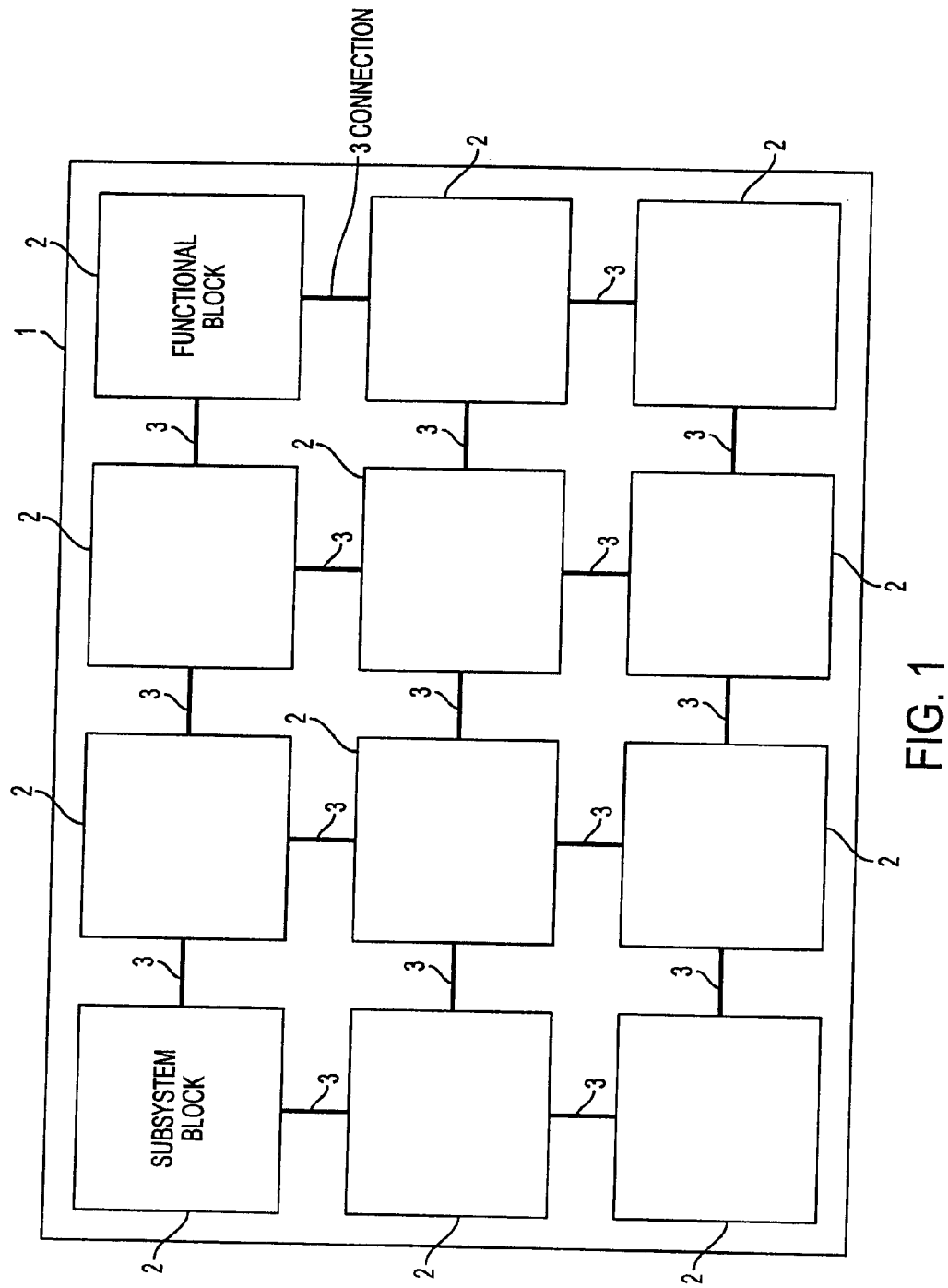

A system using the SDI model can be designed using the following method, as shown in the schematic flowchart in FIG. 10.

At step 1, the overall system (the overall chip 1) is designed using the QDI model, and at step 2, the system is divided into subsystems (blocks 2) defined by L above.

At step 3, the part of each subsystem to which the SDI model is applicable is detected. That is, the order of the occurrence of signal transitions (the causal sequence for the implementation of a function) and the timing margin are considered for each signal transition within each subsystem to detect those paths to which the SDI model is applicable.

At step 4, instead of the QDI model, the SDI model is used to design those parts to which the SDI model is determined to be applicable.

This invention is not limited to the above embodiment and those skilled in the art may made various additions or changes thereto without deviating from the scope of this invention. For example, each logic circuit can be configured using different types of gates that are not shown in the figures.

In addition, this embodiment is applicable to various asynchronous digital systems such as CPUs, MPUs, and DSPs. It can be preferably applied to systems used under harsh environment, for example, in a spaceship, a satellite, a submarine, and an ultimate operation robot.

Furthermore, if the area of the chip is small, the overall chip may be controlled by the SDI model.

As described above, the asynchronous digital system according to this invention can improve the processing speed while maintaining reliability.

What is claimed is:

1. An asynchronous digital system for processing signals without using clock signals distributed throughout the system, wherein said system comprises circuit components having an assumed delay in which if the implementation of a function requires that a first signal transition (a) occurs to cause a second signal transition (b) and a third signal transition (c) and that said second signal transition (b) precedes said third signal transition (c), k·Tab<Tac is established wherein Tab is the time from the occurrence of said first signal transition (a) until the occurrence of said second signal transition (b), Tac is the time from the occurrence of said first signal transition (a) until the occurrence of said third signal transition (c), and (k) is a constant which is a real number larger than 1.

2. The asynchronous digital system according to claim 1, wherein data flowing through said asynchronous digital system comprises temporal information.

3. The asynchronous digital system according to claim 2, wherein said data is encoded so as to include said temporal information.

4. An asynchronous digital signal processing circuit for processing input data d1 to generate new data d2, wherein said circuit includes a completion signal generation circuit for generating a completion signal indicating that said new data d2 has become valid, said completion signal generation circuit comprises circuit components having an assumed delay in which k·Td<Ts is established wherein Td is the time since said input data d1 becomes valid until said new data d2 becomes valid, Ts is the time since said input data d1 becomes valid until said completion signal is generated, and (k) is a constant which is a real number larger than 1.

5. A digital system comprising one or more first digital signal processing system(s) and one or more second digital signal processing system(s), wherein said first digital signal processing system controls processing timing of digital signals using clock signals, and wherein said second digital signal processing system is divided into a plurality of subsystems each having an area which does not exceed a specified area, an interconnection between said plurality of subsystems is formed by applying thereto a first delay model assuming that an upper limit value of the delay is unknown, and each of said plurality of subsystems is formed by applying thereto a second delay model assuming that the upper limit value of the delay is unknown but the upper limit value of the ratio of the variation rates of two arbitrary delays is known.

6. The digital,system according to claim 5, wherein data flowing through said second digital signal system comprises temporal information.

7. The digital system according to claim 6, wherein said data is encoded so as to include said temporal information.

8. A digital system comprising one or more first digital signal processing system(s) and one or more second digital signal processing system(s), wherein said first digital signal processing system controls processing timing of digital signals using clock signals, and wherein said second digital signal processing system includes circuit components having an assumed delay in which if the implementation of a function requires that a first signal transition (a) occurs to cause a second signal transition (b) and a third signal transition (c) and that said second signal transition (b) precedes said third signal transition (c), k·Tab<Tac is established wherein Tab is the time from the occurrence of said first signal transition (a) until the occurrence of said second signal transition (b), Tac is the time from the occurrence of said first signal transition (a) until the occurrence of said third signal transition (c), and (k) is a constant which is a real number larger than 1.

9. The digital system according to claim 8, wherein data flowing through said second digital signal system comprises temporal information.

10. The digital system according to claim 9, wherein said data is encoded so as to include said temporal information.

11. A semiconductor chip on which one or more first digital signal processing system(s) and one or more second digital signal processing system(s) are provided, wherein said first digital signal processing system controls processing timing of digital signals using clock signals, and wherein said second digital signal processing system is divided into a plurality of subsystems each having an area which does not exceed a specified area, an interconnection between said plurality of subsystems is formed by applying thereto a first delay model assuming that an upper limit value of the delay is unknown, and each of said plurality of subsystems is formed by applying thereto a second delay model assuming that the upper limit value of the delay is unknown but the upper limit value of the ratio of the variation rates of two arbitrary delays is known.

12. The semiconductor chip according to claim 11, wherein data flowing through said second digital signal system comprises temporal information.

13. The semiconductor chip according to claim 12, wherein said data is encoded so as to include said temporal information.

14. A semiconductor chip on which one or more first digital signal processing system(s) and one or more second digital signal processing system(s) are provided, wherein said first digital signal processing system controls processing timing of digital signals using clock signals, and wherein said second digital signal processing system includes circuit components having an assumed delay in which if the implementation of a function requires that a first signal transition (a) occurs to cause a second signal transition (b) and a third signal transition (c) and that said second signal transition (b) precedes said third signal transition (c), k·Tab<Tac is established wherein Tab is the time from the occurrence of said first signal transition (a) until the occurrence of said second signal transition (b), Tac is the time from the occurrence of said first signal transition (a) until the occurrence of said third signal transition (c), and (k) is a constant which is a real number larger than 1.

15. The semiconductor chip according to claim 14, wherein data flowing through said second digital signal system comprises temporal information.

16. The semiconductor chip according to claim 15, wherein said data is encoded so as to include said temporal information.

17. A digital system comprising one or more synchronous digital signal processing circuit(s) and one or more asynchronous digital signal processing circuit(s), wherein said asynchronous digital signal processing circuit processes input data d1 to generate new data d2, and includes a completion signal generation circuit for generating a completion signal indicating that said new data d2 has become valid, said completion signal generation circuit comprises circuit components having an assumed delay in which k·Td<Ts is established wherein Td is the time since said input data d1 becomes valid until said new data d2 becomes valid, Ts is the time since said input data d1 becomes valid until said completion signal is generated, and (k) is a constant which is a real number larger than 1.

18. The digital system according to claim 17, wherein said synchronous digital signal processing circuit(s) and said asynchronous digital signal processing circuit(s) are provided on the same semiconductor chip.

* * * * *

UNITED STATES PATENT AND TRADEMARK OFFICE
CERTIFICATE OF CORRECTION

PATENT NO. : 6,606,356 B1
DATED : August 8, 2003
INVENTOR(S) : Nanya

It is certified that error appears in the above-identified patent and that said Letters Patent is hereby corrected as shown below:

Drawings,
Delete drawing sheet 1 of 10, and substitute therefor the attached drawing sheet 1 of 10 consisting of figure 1.

Signed and Sealed this

Sixteenth Day of December, 2003

JAMES E. ROGAN
*Director of the United States Patent and Trademark Office*